Figure 1:
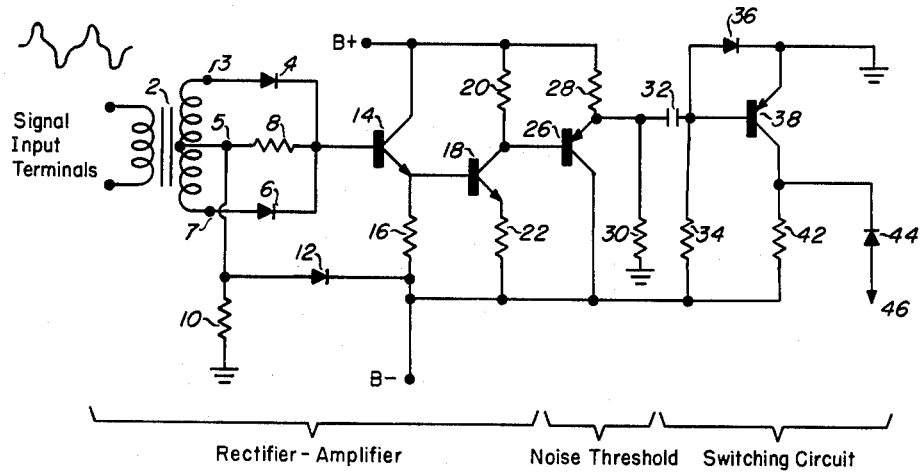

April 26, 1966  R. R. LEONARD  3,248,560

INFORMATION HANDLING APPARATUS

Filed Oct. 9, 1961

INVENTOR.
ROBERT R. LEONARD

BY Fred Jacob

ATTORNEY

3,248,560
INFORMATION HANDLING APPARATUS
Robert R. Leonard, Boston, Mass., assignor to Honeywell Inc., a corporation of Delaware
Filed Oct. 9, 1961, Ser. No. 143,781
4 Claims. (Cl. 307—88.5)

The present invention relates in general to a peak amplitude detection system and more particularly to transistor apparatus responsive to peak excursions in an input signal waveform.

For many circuit applications, such as magnetic tape playback systems for example, apparatus is required that will indicate the occurrence of peaks in a variable amplitude waveform. Past example of such devices have taken the form of amplitude-dependent detection circuitry whereby an output indication is obtained when the input signal amplitude exceeds a predetermined threshold level. Such circuits exhibit disadvantages, however, when subjected to an input waveform containing a series of pulses of finite slope and variable peak amplitude. It becomes clear that when the peak amplitude of an input pulse falls below the preset threshold level, the detector circuitry will remain inactive and information will be discarded. On the other hand, a high-amplitude input pulse will activate the amplitude-dependent detector apparatus in advance of the signal peak condition.

An example of an input signal having the abovementioned peak amplitude variations is the waveform recovered from a magnetic recording tape which is used as the recording medium in a digital data recording system. Such a waveform may show a series of pulses of alternate polarity each representing a binary digit of recorded data. The peak amplitude of the individual data pulses may not be precisely controlled, since it is dependent upon such variables as the magnetic properties of the recording tape and the proximity of the tape to the record or playback heads. The mere presence of a particle of foreign matter on the surface of the recording tape, for instance, may cause a pronounced reduction in the recovered pulse signal amplitude.

Since individual pulses are generally identified during discrete timing intervals, it becomes necessary to detect the position of the apogee accurately for each pulse. This is of particular importance in high-speed data processng systems where the false advance or delay of an output indication may cause operational errors. In view of the aforementioned criteria, it becomes obvious that peak detectors of the amplitude-dependent variety cannot perform the functions required for such a system adequately.

Accordingly, it is an object of the present invention to provide a new and improved peak detection system which is not subject to the foregoing disadvantages.

It is a further object of the present invention to provide a peak detection system of improved sensitivity.

It is another object of the present invention to provide a transistorized peak detection system capable of indicating both positive and negative peak excursion levels.

The present invention comprises a peak detection system which accepts bipolar input signals of variable peak amplitude. An accurate indication of the signal peak condition is obtained by means of circuitry which responds to a reversal of slope of the input signal. Minor slope changes of the input signal waveform, which may occur near the zero voltage level, are incapable of actuating the peak detection circuitry and will not provide erroneous output indications.

Figure 2:
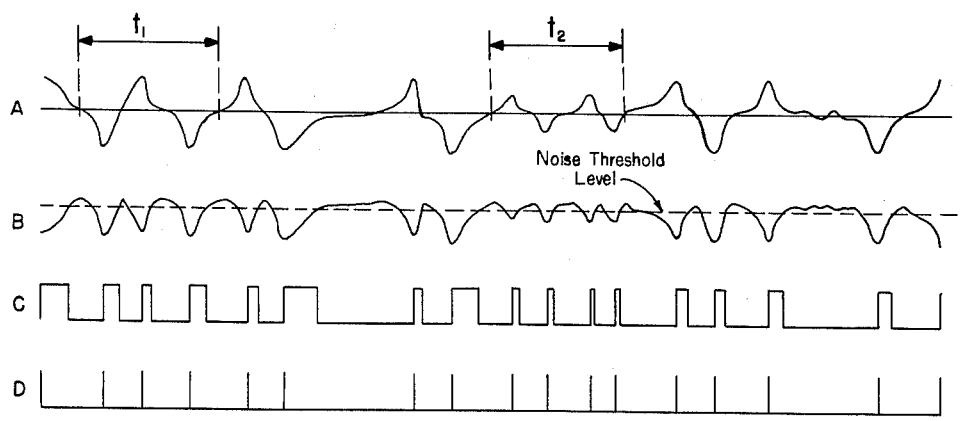

The various novel features which characterize the invention are pointed out with particularity in the claims annexed to and forming a part of this specification. For a better understanding of the invention, its advantages and specific objects thereof, reference should be had to the accompanying drawings, in which:

FIGURE 1 illustrates a preferred embodiment of a peak detection system in accordance with the principles of the present invention; and FIGURE 2 shows signal waveforms illustrative of certain operations of the invention.

With reference now to FIGURE 1, the illustrated peak detection system is seen to consist of a rectifier amplifier section, a noise threshold section and a switching circuit. The input signal applied to the input winding of transformer 2 is seen to comprise a series of positive and negative pulses. The secondary winding of transformer 2 forms part of a full-wave rectifier circuit comprising a pair of semiconductor rectifiers 4 and 6, having their anode terminals connected to the transformer end terminals 3 and 7 respectively. The cathode elements of semiconductor rectifiers 4 and 6 are connected together at the common junction of a resistor 8 and the base element of a transistor 14. The other terminal of resistor 8 is connected to the junction of a resistor 10, the anode element of diode 12 and the center tap 5 of transformer 2. The other terminal of resistor 10 is connected directly to ground and the cathode element of diode 12 is connected to a source of negative potential B—. Transistor 14 is connected as an emitter-follower, its collector element being coupled directly to a positive potential source B+ and its emitter element being connected to the B— source by way of a load resistor 16. The emitter element of transistor 14 is further connected to the base element of a transistor 18. The emitter element of transistor 18 is returned to the negative potential source B— by means of a resistor 22. The collector element of transistor 18 is returned to the B+ source by means of a resistor 20 and is further connected to the base element of a transistor 26.

Transistor 26 is connected as an emitter-follower, its collector element being returned directly to the B— source. The emitter element of transistor 26 is connected to the B+ source by means of a resistor 28, to ground by means of a resistor 30 and to the base element of a transistor 38 by means of a condenser 32. A resistor 34 is connected between the base of transistor 38 and the source of negative biasing potential B—. The base of transistor 38 is further connected to the anode element of a semiconductor diode 36. The cathode element of diode 36 and the emitter element of transistor 38 are each connected to ground. The collector element of transistor 38 is returned to a source of negative potential by means of a load resistor 42, as well as to the cathode element of a semiconductor diode 44. The anode element of semiconductor diode 44 is connected to an output line 46.

The operation of the apparatus of FIGURE 1 will now be explained with reference to FIGURE 2. Input signals, such as amplified playback signals from a magnetic tape recording system as shown in FIGURE 2A, are applied to the primary winding of transformer 2. The secondary winding of transformer 2 in conjunction with semiconductor rectifiers 4 and 6 acts as a full-wave rectifier. The resultant positive pulses developed across resistor 8 are applied to the base element of the emitter-follower 14. Input signals derived from a magnetic tape may be of very low amplitude. In order to ensure that the low-level rectified waveform will exceed the base-emitter threshold voltage of transistor 14, a small forward biasing voltage is supplied to the base-emitter junction.

This is accomplished by means of the forward voltage drop across diode 12 which is applied to the base element through the load resistor 8. Diode 12 is maintained in forward conduction by means of a current path including the negative potential source B—, diode 12 and resistor 10. Hence low amplitude input signals supplied to transistor 14 may be readily transmitted to the amplifying section of the circuit which includes transistor 18. Emitter-follower 14 provides signal-load isolation and the current gain necessary for the proper operation of the transistor amplifier 18. Resistor 22 serves to limit the quiescent current through transistor amplifier 18 to a desired value and furthermore provides degenerate feedback means necessary for gain stabilization. The rectified and amplified signal is then applied to the base element of transistor emitter-follower 26.

A typical waveform observed at the base element of transistor 26 in response to the input waveform of FIGURE 2A is illustrated in FIGURE 2B. In order to reject low-level transients which may occur at the input waveform crossover points, about the zero potential line, emitter-follower 26 is maintained quiescently nonconductive. This is accomplished by means of the voltage divider network comprising resistors 28 and 30, which provides a threshold voltage level across the base-emitter junction of transistor 26. This threshold level is shown in FIGURE 2B. As a result, minor fluctuations of the input waveform will be incapable of actuating the threshold circuitry so that signals that are positive with respect to the noise threshold level will be rejected. In an actual embodiment of the invention, the threshold level was adjusted to reject signals which fell below 10% of the expected pulse peak amplitude, a condition which safely discriminated between the low-level information pulses and system noise.

In the switching circuit, transistor 38 is quiescently maintained in a conductive state by means of the negative biasing voltage applied to the base element through resistor 34. The collector of transistor 38 will approach ground potential under these conditions. The voltage on the base with respect to ground will be the forward voltage drop across the transistor base-emitter junction. In the above-mentioned actual embodiment of the invention, this voltage approximates $-0.2$ volt. The reverse bias potential existing across diode 36 will render the latter nonconductive.

When an input pulse is applied to the primary terminals of transformer 2 whose amplitude at the collector element of transistor 18 exceeds the conduction threshold level established at transistor 26, a negative-going signal will be coupled to the transistor 38 by way of condenser 32. Since transistor 38 is already in a fully conductive state, a condenser-coupled signal having a negative slope has no effect on the collector potential. The base-emitter voltage of transistor switch 38 will remain at approximately $-0.2$ volt, regardless of the extent of the negative input signal swing. Such a condition of the switching circuit will exist until the signal coupled by condenser 32 to the base of transistor 38 reaches a peak amplitude level.

Once the peak amplitude of the input signal has been reached, and the signal at the emitter of transistor 26 assumes a slightly positive slope, current flow through condenser 32 will be reversed such that transistor 38 will become nonconductive. It may be seen that forward current flow through diode 36 will limit the positive-going voltage applied to the base element of transistor 38 to that of the forward voltage drop across the diode. In an actual embodiment of the invention, this value approximated $+0.2$ volt. As the transistor 38 switches conductive states, i.e. from the conducting to the nonconducting condition, the collector voltage will go negative, thus coupling an output signal through diode 44 to output line 46. This signal, which indicates the occurrence of a peak in the input waveform, may be used directly or it may be coupled to a suitable utilization circuit. Such a circuit may take the form of a pulse-forming circuit providing output pulses of a desired width, shape and polarity.

FIGURE 2C illustrates the signal waveform derived at the base of transistor 38 in response to the input signal of FIGURE 2A. It will be noted that the pulse amplitude of the latter signal is greatly reduced during the time interval $t_2$ as compared to the interval $t_1$. It will be seen that the switching time of transistor 38 remains unaffected by changes of the peak amplitude of the input pulses. A signal coupled to the base of transistor 38, regardless of the amplitude attained, will not cause an output pulse to be formed until the peak of the signal has been reached. To summarize, rectified and amplified input signals which exceed a noise threshold setting will be coupled to the switching circuit. Output indications will be obtained when the input signals undergo a peak excursion and exhibit a reversal of slope. The signal waveform which appears on the collector of transistor 38 will be the inverse of the waveform 2C. A typical output waveform obtained when the signal on the output line 46 is applied to a suitable pulse-forming circuit responsive to negative-going signals is shown in FIGURE 2D.

While there have been shown and described illustrative embodiments of the present invention, it will of course be understood that numerous modifications and alternative constructions may be made by those skilled in the art without departing from the spirit and scope of the invention. As an example, the switching circuit may be used with an input signal consisting of unipolar input pulses. Similarly, the input signal may consist of bipolar input pulses where an indication of pulses having a specific polarity is desired. Consequently, the invention herein disclosed is to be construed as limited only by the spirit and scope of the appended claims.

What is claimed is:

1. In a peak detection system, a switching circuit comprising a transistor having a conductive and a non-conductive state, said transistor having a base, an emitter connected to ground and a collector, condenser means adapted to couple variable amplitude signals to said base, said condenser means being connected in series with the base-emitter impedance of said transistor to form a differentiating circuit, means for biasing said base and collector respectively relative to ground, said biasing means being normally adapted to place said transistor into one of said states, and diode means connected between said base and said emitter to limit the maximum reverse bias voltage therebetween, said transistor being adapted to switch to the other one of said states upon the occurrence of a peak in said signal coupled to said base.

2. A peak detection system adapted to receive bipolar input signals, comprising means for rectifying said input signals, means responsive to said rectified input signals to transmit signals in excess of a predetermined level, a switching circuit including a transistor having a conductive and a non-conductive state, said transistor having a base, an emitter connected to ground and a collector, condenser means to couple said transmitted signals to said transistor base, said condenser means being connected in series with the base-emitter impedance of said transistor to form a differentiating circuit, means for biasing said base and collector respectively relative to ground, said biasing means being normally adapted to place said transistor into one of said states, and a diode connected between said base and said emitter poled in opposition to forward current flow through the base-emitter junction of said transistor, said diode being adapted to limit the maximum reverse bias voltage across said junction, said transistor being adapted to switch to the other one of said states upon the occurrence of a peak in said transmitted signals coupled to said base.

3. A peak detection system comprising a full-wave rectifier circuit adapted to receive a bipolar input signal, a threshold circuit adapted to reject rectified input signals below a predetermined voltage level, means for amplifying the output signal of said full-wave rectifier circuit and applying it to said threshold circuit, a condenser connected to said threshold circuit adapted to couple signals from the latter, a switching circuit comprising a transistor having a base, an emitter, and a collector, said base being connected to said coupling condenser, a first diode connected across the base-emitter junction of said transistor and poled in opposition to forward current flow across said junction, said emitter being further connected to a reference point, means for resistively coupling a negative D.C. voltage to said base and said collector respectively, said D.C. voltage being adapted to maintain the emitter-collector junction of said transistor in a normally conductive state, said transistor being adapted to become nonconductive during a portion of said condenser-coupled signal, and a second diode connected to said collector, said second diode being adapted to couple the negative-going portion of said signal derived from said switching circuit to the output of said system.

4. A peak detection system comprising a full-wave rectifier circuit adapted to receive a bipolar input signal, a threshold circuit adapted to reject rectified input signals below a predetermined voltage level, means for amplifying the output signal of said full-wave rectifier circuit and applying it to said threshold circuit, condenser means connected to said threshold circuit adapted to couple signals from the latter, a switching circuit comprising a transistor having a base, an emitter coupled to ground and a collector, said condenser means being connected in series with the base-emitter impedance of said transistor to form a differentiating circuit, a diode connected across the base-emitter junction of said transistor and poled in opposition to forward current flow across said junction, and means for resistively coupling a negative D.C. voltage to said base and said collector respectively with respect to ground, said D.C. voltage being adapted to maintain the emitter-collector junction of said transistor in a normally conductive state, said transistor being adapted to become non-conductive during a portion of said condenser-coupled signal.

References Cited by the Examiner

UNITED STATES PATENTS

| 2,561,772 | 6/1951 | Atwood | 328—114 |
| 2,928,036 | 3/1960 | Walker | 307—88.5 |
| 2,949,543 | 8/1960 | Nordahl et al. | 307—88.5 |
| 2,959,726 | 11/1960 | Jensen | 307—88.5 |
| 2,965,855 | 12/1960 | Kelchledge. | |
| 2,972,064 | 7/1961 | Hurlbut | 307—88.5 |
| 3,048,717 | 8/1962 | Jenkins | 307—88.5 |
| 3,068,367 | 12/1962 | Brown et al. | 328—120 |
| 3,073,968 | 1/1963 | Tribby | 307—88.5 |

FOREIGN PATENTS 764,390   12/1956   Great Britain.

ARTHUR GAUSS, *Primary Examiner.*

JOHN HUCKERT, *Examiner.*

B. P. DAVIS, *Assistant Examiner.*